United States Patent
Xing et al.

(10) Patent No.: US 8,222,323 B2
(45) Date of Patent: Jul. 17, 2012

(54) SELF-REPAIRING CONCRETE HAVING POLYURETHANE POLYMER MICRO-CAPSULES AND METHOD FOR FABRICATING THE SAME

(76) Inventors: Feng Xing, Guangdong (CN); Zhuo Ni, Guangdong (CN)

( * ) Notice: Subject to any disclaimer, the term of this patent is extended or adjusted under 35 U.S.C. 154(b) by 0 days.

(21) Appl. No.: 12/863,659

(22) PCT Filed: Oct. 24, 2008

(86) PCT No.: PCT/CN2008/072832
§ 371 (c)(1),
(2), (4) Date: Jul. 20, 2010

(87) PCT Pub. No.: WO2009/140835
PCT Pub. Date: Nov. 26, 2009

(65) Prior Publication Data
US 2011/0054070 A1 Mar. 3, 2011

(30) Foreign Application Priority Data
May 20, 2008 (CN) .......................... 2008 1 0067314

(51) Int. Cl.
*B01F 3/08* (2006.01)

(52) U.S. Cl. ........ 523/346; 523/176; 523/205; 523/206; 523/210; 524/2; 524/4

(58) Field of Classification Search .................. 523/176, 523/205, 206, 210, 346; 524/2, 4
See application file for complete search history.

(56) References Cited

FOREIGN PATENT DOCUMENTS
JP            57-71843       *  5/1982
* cited by examiner

*Primary Examiner* — Edward Cain
(74) *Attorney, Agent, or Firm* — Raymond Y. Chan; David and Raymond Patent Firm

(57) ABSTRACT

A self-repairing concrete includes polyurethane polymer micro-capsules, in which the polyurethane polymer micro-capsules are mixed for a fixed function of micro-cracks. The quality mixture ratio is: concrete/micro capsules/water=100: 1-15:15-50. The manufacturing method is weighing a full amount of water in a container, adding polyurethane polymer micro-capsules, stirring, until fully dispersed microcapsules; pouring the water into the mixing container, adding the corresponding quality of cement; stirring; adding sand and gravel filling materials, conducting worksite watering, ⅓ volume for each time, vibrating, and air exhausting; until the slurry filling mold.

2 Claims, No Drawings

SELF-REPAIRING CONCRETE HAVING POLYURETHANE POLYMER MICRO-CAPSULES AND METHOD FOR FABRICATING THE SAME

The present invention relates to a self-repairing concrete having polyurethane polymer micro-capsules and a method for fabricating such concrete.

GENERAL BACKGROUND

As a representative of the traditional building materials, concrete has its inherent advantages of compressive strength, high durability and low cost, therefore being widely used in industrial and civil buildings, bridges, road works, underground works, water conservancy and hydropower projects, nuclear power plants, ports and ocean engineering structures. Currently, the concrete is used in the large-span structures, high-rise structures, mega-structure and the special structure as the most widely applied material that has more than 100 years of history.

In the foreseeable future, the concrete is still an indispensable building materials in the country's modernization construction. In-service concrete structures due to the use of long-term process and under the influence of the surrounding complex environment, will inevitably produce micro-cracking and local damage. Those defects usually would reduce the life of the structure, cause re-structure, even threaten safety. Therefore, the structural repair of cracks in concrete is a long-troubled technical problem to civil engineers. Researches on raw materials, mixing ratio, additives, manufacturing processes, casting processes do not fundamentally change the performance of weaknesses of the concrete. Therefore, to repair the crack of the concrete in service timely and effectively has become a major concern of scientists and engineers. Due to damage caused by macro such as earthquakes, wind loads, shock, you can visually detect and fix it manually, using traditional methods (program repair and post-restoration) on the crack repair. In the actual structure of concrete works, there are many small cracks, such as micro-cracking of base body and so on, and these micro-scale damage may be undetectable due to the limitations of detection technology. Therefore, it becomes very difficult to repair these undetectable cracks and damage, if not impossible. If the cracks or damage can not be timely and effectively restored, the structure will not only affect the normal use of the performance and shorten the life, but also macro-cracks may be triggered and lead to structural brittle fracture, resulting in a serious catastrophic accidents. There is an urgent need to adopt a certain technology or method that can initiatively and automatically to repair and restore the cracks and damage, or even can increase the strength of concrete materials in order to achieve a purpose of extending the service life of concrete structures. Conventional concrete and method for fabricating concrete cannot make the solution of micro-cracks self-diagnose and self-repair.

The self-repair of the concrete is conducted by adding special components (such like shape memory alloy) to form intelligent self-repair system that can be automatically triggered to fix the damage or cracks of the concrete material.

Currently, researches about self-repairing concrete structures are concentrated in the hollow fiber restoration techniques. Although it is still in the laboratory stage, the hollow fiber capsules proof the function of the self-repairing concrete. However, the construction process of concrete causes vibrations, etc., which disturb the arrangement of hollow fiber capsule design, and even lead to rupture of the glass wall material, namely the premature loss of restorative, which is unable to attain the purpose of repairing concrete and affect the feasibility of self-repairing process of the concrete and the repeatability of self-repairing capacity of the concrete. During a process of oxidation and use, micro-cracks and cracks in concrete structures appeared in large numbers randomly. Self-repairing technique requires the repair capsules evenly distributed in the concrete structure. Because the hollow fiber material has restrictions due to the brittle characteristic, the hollow fiber capsules can not ensure micro-capsule material in concrete in the uniform distribution, so that the fiber capsule of the micro-cracks in self-repairing process of the concrete structure can only adopt special concrete materials and special technique. These difficulties limit the hollow fiber capsules in repair cracks in the concrete structure effectively. Surface properties, wall material strength, geometry parameters and content of hollow fiber capsule have significant impacts on the repair of concrete results. Fibrous capsule wall material is smooth and in lower bond strength of concrete that make concrete hard to form an effective phase interface. Hollow fiber capsule has larger size, sometimes up to millimeters in diameter and can be considered that fixed agents are introduced as well as defects, inevitably, in the concrete structure, which will reduce the concrete's own strength and self-repairing efficiency. Hollow fiber capsule wall material a large strength of glass, thus stress generated by the micro-cracks of the concrete may be difficult to provide enough energy to the make hollow fiber capsule rupture, and this technology may only fix large cracks while in critical factor of damages of the concrete structure, micro-crack, may be very limited for the micro-crack to be self-repairing. This shows that the method still has many problems to be solved in engineering applications, including durability of the fibrous capsule, timeliness of repairing, interface compatibility, reliability, and feasibility of restoration and other issues in engineering applications. It is obvious that early repair of micro-cracks is significant and essential for the durability of concrete structures, so that the use of hollow fiber micro-capsule technology does not fit micro-cracks repairing for reasons including the above-mentioned limitations.

What is needed, therefore, is a self-repairing concrete having polyurethane polymer micro-capsules. What is also needed is a method for fabricating such concrete.

SUMMARY

It is an object of the present invention to provide a self-repairing concrete having polyurethane polymer micro-capsules that can effectively achieve self-repairing of the micro cracks of the concrete.

It is another object of the present invention to provide a method for fabricating concrete of self-repairing of the micro cracks.

One exemplary embodiment of the present invention is a self-repairing concrete including polyurethane polymer micro-capsules, wherein a mass ratio of the self-repairing concrete is: concrete/micro capsules/water=100:1-15:15-50.

Another exemplary embodiment of the present invention is a method for fabricating a self-repairing concrete including (1) Weighing enough dose of water, adding in a proper portion of polyurethane polymer micro-capsules, then stirring until fully dispersed; (2) Poring the above mixture to a mixing container, adding in corresponding dose of concrete; (3) Slowerly stirring the concrete and then faster stirring; (4) Gradually adding concrete slurry, each time at ⅓ of total dose, vibrating and excluding bubbles until the third times of concrete slurry being added to fill in the mixing container.

Another exemplary embodiment of the present invention is a method for fabricating a self-repairing concrete including (1) Weighing enough dose of water, adding in a proper portion of polyurethane polymer micro-capsules, then stirring until fully dispersed; (2) Poring the above mixture to a mixing container, adding in corresponding dose of concrete; (3) Slowerly stirring the concrete, and then faster stirring; (4) Gradually or step-by step irrigating work pieces after vibrating the concrete mixture; (5) Putting the above mixture aside for 1-2 hours, scraping the concrete slurry overflowed from the mold, then laying aside for 21-26 hours; (6) Removing the mold and then transferring the sample to conservation container for 25-31 days.

Other novel features and advantages will become more apparent from the following detailed description when taken in conjunction with the accompanying drawings.

DETAILED DESCRIPTION OF PREFERRED EMBODIMENTS

Embodiment 1: Diluent is adopted to improve a liquidity and an adhesive performance of an epoxy resin and a repair efficiency of self-repairing of a concrete of composite materials is increased. 20% 17 alkyl imidazole solidifying agent is added to the epoxy adhesive E-51; then 20% N-butyl glycidyl ether (BGE) is added, the viscosity is decreased from 8200 mpa·s to 200 mpa·s and the liquidity of the epoxy adhesive is improved, helping the capillary siphon effect occurs; a tensile strength change is from 14.0 MPa up to 17.6 MPa, modulus from 223.3 MPa to 334.0 MPa, proving that the BGE help improve the mechanical performance of the epoxy resin. Analysis of FTIR shows that the diluent involves a cross-reaction of the epoxy resin and the solidifying agent.

Embodiment 2: With polyurethane as the cyst wall, capsule core material such as the repair agent and epoxy resin are wrapped to form a sealed cyst membrane, which are used for fabricating micro-capsules of self-repairing concrete. 10 grams of carbamide are dissolved in 20.0 grams of 37% formaldehyde, and the pH value is adjusted to 8.5 by trolamine. In the mixing state and at 70° C. constant temperature conditions, with one hour of reaction, prepolymer is obtained. 80-160 ml distilled water are added into 14.0 grams of epoxy resin of embodiment 1, with 20 minutes of violent stirring, W/O emulsion with high stability is obtained. Within two hours period, the pH value is adjusted to 4-5 with 2% sulphuric acid. Under conditions of 300-1200 rpm mixing speed and 50° C.-80° C. reaction temperature, about 2-3 hours reaction are undertaken. The product after cooled, washed with distilled water, and dried, white micro-capsules material are obtained. The micro-capsule has ball shape, with an average diameter of 120 microns and a capsule wall thickness of 3.5 microns.

Embodiment 3: Surface active agent is adopted to help improved the liquidity and dispersity of polymer material micro-capsules used in fabricating self-repairing concrete. 1.5 grams of dodecyl benzene sulphonic acid are added to 100 grams of the epoxy resin material having polymer micro-capsules, after 30 minutes of stirring, powdery substance with good liquidity and dispersity are obtained.

Embodiment 4: Polyurethane polymer micro-capsules material is used to prepare sample of concrete having self-repairing function. 38.0 grams water is added with 2.0 grams polyurethane micro-capsules, stirring until fully dispersed. The water is poured into a mixing container and 100 grams cement are added therein. Stirring, vibrating, and work piece irrigating are conducted. After one hour of being put aside, the mold is formed. After mold overflow of concrete slurry being scraped, the mold is put aside 24 hours. Then after the mold removed the sample is transferred into the conservation container for 28 days.

Testing of a strength of flexure and analysis of a pattern of fracture. During the process of fracture, the organic micro-capsules are destructed by stress, and a small portion of are separated at interface of the organic micro-capsules and the concrete. Organic micro-capsules and concrete can form a good interface. By using concrete having organic micro-capsules material, an original state compared to a destructed state, the strength of flexure is changed little or increased by a little, and the mechanic performance has a great restoration. This proves that the organic micro-capsule structure has the function of repairing for the cement structure. In the self-repairing concrete structure, stress causes the micro-capsules fracture, and the capsule cores released are capable of flowing to the fracture surface due to an effect of capillary siphon, thus the capsule cores contact the solidifying agent and have polymerization reaction therein, forming repairing fracture surface of enough high strength, such that achieve the purpose of repairing the concrete.

Embodiment 5: Technology of fabricating concrete material with self-repairing function by using polyurethane polymer micro-capsules. 38.0 grams of water are weighted, and 5.0 g of micro-capsules are added, then stirring the mixture until the micro-capsules being fully dispersed. The mixture is put into a mixing container, and 60.0 g of cement, 20.0 g of sandstone, 10 g of phosphorous slag powder and 10 g of coal ash are added. Then operations of stirring, vibrating, and work piece irrigating are performed. After one hour of being put aside, the mold is formed. After mold overflow of concrete slurry being scraped, the mold is put aside 24 hours. Then after the mold being removed the sample is transferred into the conservation container for 28 days.

Embodiment 6: Method for fabricating self-repairing concrete using polyurethane polymer micro-capsules.
(1) Weighing enough dose of water, adding in a proper portion of polyurethane polymer micro-capsules, then stirring until fully dispersed;
(2) Poring the above mixture to a mixing container, adding in corresponding dose of concrete;
(3) Slowerly stirring the concrete (300 rpm), and then faster stirring (800 rpm);
(4) Gradually adding concrete slurry, each time at ⅓ (one third) of total dose, vibrating and excluding bubbles until the third times of concrete slurry being added to fill in the mixing container.
(5) Putting the above mixture aside for one hour, scraping the concrete slurry overflowed from the mold, then laying aside for 24 hours;
(6) Removing the mold and then transferring the sample to conservation container for 28 days.

During the process of mixing, solidifying and curing of the concrete material, the micro-capsules have no fracture. The self-repairing concrete using polymer micro-capsules has good process operability, self-repairing repeatability, and industrial application possibility.

It is to be understood, however, that even though numerous characteristics and advantages of exemplary and preferred embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method for fabricating a self-repairing concrete comprising:
   (1) Weighing enough dose of water, adding in a proper portion of polyurethane polymer micro-capsules, then stirring until fully dispersed; (2) Poring the above mixture to a mixing container, adding in a corresponding dose of concrete; (3) Slower stirring the concrete and then faster stirring; (4) Gradually adding concrete slurry, each time at ⅓ of total dose, vibrating and excluding bubbles until the third times of concrete slurry being added to fill in the mixing container.

2. A method for fabricating a self-repairing concrete comprising: (1) Weighing enough dose of water, adding in a proper portion of polyurethane polymer micro-capsules, then stirring until fully dispersed; (2) Poring the above mixture to a mixing container, adding in corresponding dose of concrete; (3) Slowerly stirring the concrete, and then faster stirring; (4) Gradually or step by step irrigating work pieces after vibrating the concrete mixture; (5) Putting the above mixture aside for 1-2 hours, scraping the concrete slurry overflowed from the mold, then laying aside for 21-26 hours; (6) Removing the mold and then transferring the sample to conservation container for 25-31 days.

* * * * *